United States Patent
Tahmasebi

(10) Patent No.: US 12,174,949 B2
(45) Date of Patent: Dec. 24, 2024

(54) METHOD AND APPARATUS USING VIRTUAL ISOLATION LAYER IN DATA SECURITY

(71) Applicant: Lilly Nahal Tahmasebi, Hayward, CA (US)

(72) Inventor: Lilly Nahal Tahmasebi, Hayward, CA (US)

( * ) Notice: Subject to any disclaimer, the term of this patent is extended or adjusted under 35 U.S.C. 154(b) by 29 days.

(21) Appl. No.: 17/090,924

(22) Filed: Nov. 6, 2020

(65) Prior Publication Data
US 2021/0103656 A1  Apr. 8, 2021

(51) Int. Cl.
| | |
|---|---|
| *G06F 21/55* | (2013.01) |
| *G06F 9/455* | (2018.01) |
| *G06F 21/30* | (2013.01) |
| *G06F 21/60* | (2013.01) |
| *G06N 5/04* | (2023.01) |
| *G06F 21/56* | (2013.01) |

(52) U.S. Cl.
CPC ........ *G06F 21/554* (2013.01); *G06F 9/45558* (2013.01); *G06F 21/30* (2013.01); *G06F 21/602* (2013.01); *G06F 21/606* (2013.01); *G06N 5/04* (2013.01); *G06F 2009/45562* (2013.01); *G06F 21/56* (2013.01); *G06F 2221/034* (2013.01)

(58) Field of Classification Search
CPC ........ G06F 21/30; G06F 21/606; G06F 21/78
See application file for complete search history.

(56) References Cited

U.S. PATENT DOCUMENTS

| | | | | |
|---|---|---|---|---|
| 10,503,610 | B1* | 12/2019 | Shemer | G06F 11/1464 |
| 10,797,885 | B1* | 10/2020 | Griffin | H04L 9/3247 |
| 11,722,491 | B1* | 8/2023 | Al-Rashid | H04L 63/1433 |
| 2010/0138652 | A1* | 6/2010 | Sela | H04L 9/3228 |
| | | | | 713/158 |
| 2010/0174920 | A1* | 7/2010 | Buckingham | G06F 21/575 |
| | | | | 713/193 |
| 2013/0191638 | A1* | 7/2013 | Spector | H04L 9/321 |
| | | | | 713/168 |
| 2015/0089218 | A1* | 3/2015 | Overby | G06F 21/78 |
| | | | | 713/161 |
| 2016/0274065 | A1* | 9/2016 | Pellegrino | G01N 29/44 |

(Continued)

*Primary Examiner* — Teshome Hailu
(74) *Attorney, Agent, or Firm* — Jubin Dana; Dana Legal Services

(57) ABSTRACT

The present invention provides a method and apparatus for a highly secure Air-Gapped storage or repository (Transportable Storage). The apparatus has a storage stack that can be completely isolated and not accessible to outside of the system except through an internal virtual network connected to the main or primary storage stack with special protocols and authentications trusted by both parties (primary and Transportable Storage Stack(s)) and hosted on the virtual layer. The storage stacks could be either virtual or physical. The system uses a consensus algorithm to achieve consensus in order to authorize/validate any user, action or function. The system using this method might also be environment-aware or policy enabled and can take proper actions in case of malicious network attacks or problems detected by anti-virus software. In addition, it can make itself offline or invisible. The system can be online or offline at specific times either manually or based on automated scripts, schedule, policy or event(s).

20 Claims, 2 Drawing Sheets

(56) References Cited

U.S. PATENT DOCUMENTS

| | | | |
|---|---|---|---|
| 2017/0094510 A1* | 3/2017 | Khosravi | H04L 63/04 |
| 2018/0054432 A1* | 2/2018 | Bailey | G06F 16/162 |
| 2018/0115514 A1* | 4/2018 | Chou | G06F 21/50 |
| 2019/0303603 A1* | 10/2019 | Courtney | G06F 3/0634 |
| 2020/0036531 A1* | 1/2020 | Minovic | H04L 9/0637 |

* cited by examiner

METHOD AND APPARATUS USING VIRTUAL ISOLATION LAYER IN DATA SECURITY

BACKGROUND

Field of the invention

The present invention relates to security, immunity and isolation of storage stacks and prevention of access by unauthorized users, viruses, ransomware, hacking and malicious network attacks by completely isolating (airgap) transportable storage stack(s) from external entities except through special connection, pre-agreed protocol, secret key or any combination of these.

Discussion of the Related Art

The following description includes information that may be useful in understanding the present invention. It is not an admission that any of the information provided herein is prior art or relevant to the presently claimed invention, or that any publication specifically or implicitly referenced is prior art.

A number of methods are generally used for isolating and air gapping a system. These include (1) standalone systems with no network connections, (2) standalone local network without connections to external world and (3) offline storage systems. Unfortunately, these systems have limitations as they are inconvenient, not practical in use cases, have security risk and are often cost prohibitive for users.

However, there is still the need for one or more storage stacks. While a primary storage stack is connected to external entities, the storage stack has the capability to keep important data completely secure and isolated from unauthorized users, viruses, ransomware, hacking and malicious network attacks in the isolated transportable storage stack(s). There are many applications that would benefit from such a configuration, for example, backup, disaster recovery and many more.

SUMMARY OF THE INVENTION

The summary of the invention does not necessarily disclose all the features essential for defining the invention: the invention may reside in a sub-combination of the disclosed features.

The present invention addresses the storage security and immunity by providing a method and apparatus called, "Air-Gap" for isolating the critical data storage from the external world. It uses a primary storage stack which is accessible via network for general use and a secondary transportable storage stack which is completely isolated from the external world and is used for storing critical data. The only way to communicate with or access the transportable storage stack is through an internal virtual network and special protocol only known to primary and transportable storage stack(s). The secondary transportable storage stack does not primarily connect with the external connections.

In another embodiment, all communications between the primary storage stack and the transportable storage stack(s) use end-to-end secret key encryption and independent authentication mechanism controlling each storage stack, primary and Transportable storage stack(s).

The transportable storage stack(s) can be virtual or physical and can be either local or external to the system or even in the cloud.

The second storage controller will have multifactor authentication to prevent users from gaining access and making any changes without completing multifactor authentication.

Multifactor authentication methods can be any or the combination of verification factors including but not limited to pin, email, text, telephone call, token, iris scan, and fingerprint. The multifactor authentication can have one or more methods, person(s) or entity associates with authentication, approval. Or access to any resources.

The second storage controller may have consensus algorithms to further prevent users from gaining access and deleting or making any charges without first being allowed access through consensus of the closed network of users.

The system consists of user(s), admin(s) and/or stakeholder(s), may establish a minimum number of stakeholders or users to give agreement before access to the user asking for access' request are validated.

The system may establish a key user(s), admin(s) and/or stakeholder(s) or those meet certain requirements or characteristics to agree before access to the user asking for access' request is validated.

The system may use multi factor authentication within the consensus algorithm to help establish consensus.

The transportable storage stack(s) can be replicated, migrated or moved. The transportable storage stack(s) is environment aware. It can make itself offline as directed per policies, triggers or events such as network attacks, viruses, and ransomware detection. It also can be used per schedule either manually or automatic at specific times and dates and/or as per defined policy for data movement from primary to transportable storage stack(s) and vice versa.

A better understanding of the present invention and its advantages will be more apparent after referencing the following detailed description of the invention and accompanying drawings which set forth an illustrative embodiment of the principles the invention utilizes.

BRIEF DESCRIPTION OF THE DRAWINGS

The above and other aspects, features and advantages of the present invention will be more apparent from the following more detailed description thereof, presented in conjunction with the following drawings wherein.

DETAILED DESCRIPTION

Figure 1:
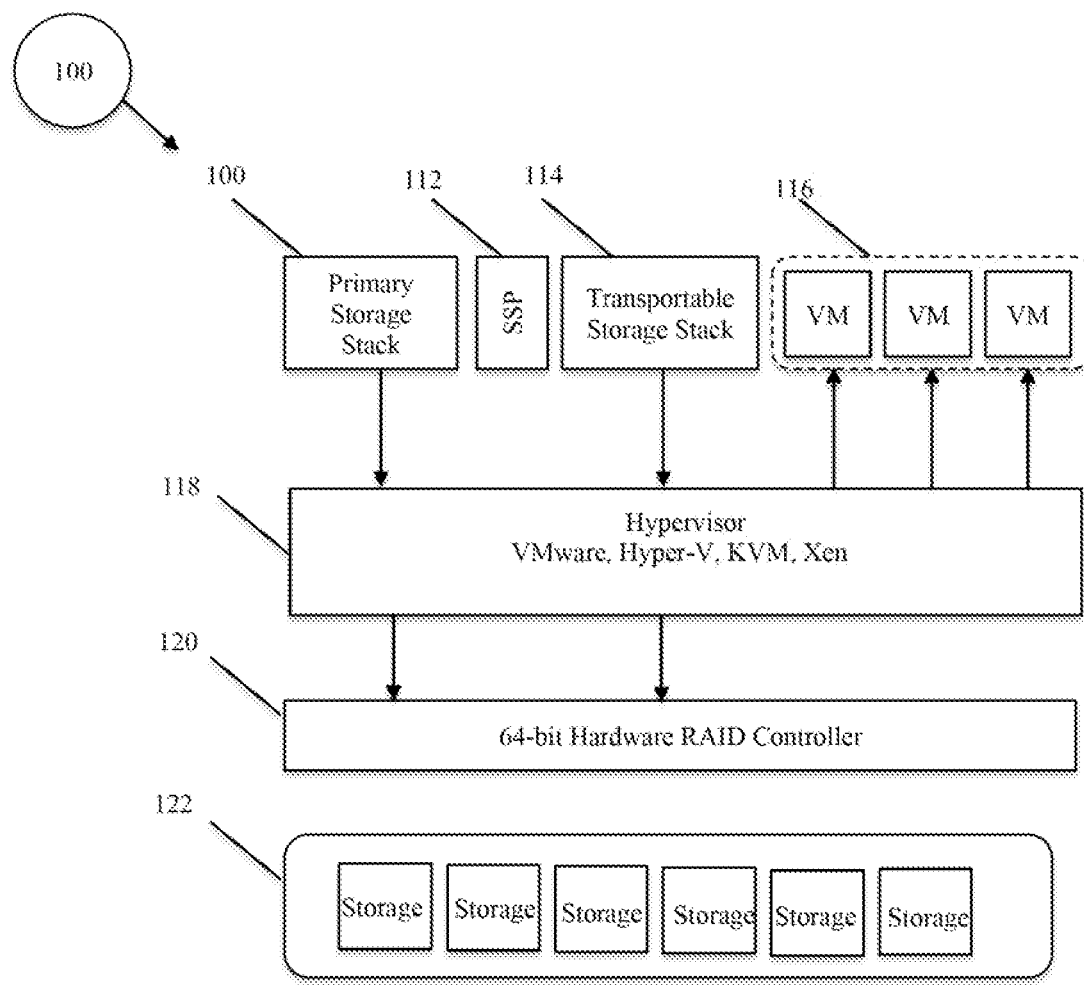
FIG. 1 depicts a simplified block diagram of an apparatus for providing a primary storage stack and a transportable storage stack that is completely isolated from the external world.

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure FIG. 1 depicts a simplified block diagram of the apparatus 100 which consists of two different storage stacks. The first storage stack 110 (primary storage stack) is a stack used by all users of the system and functions as a normal storage stack as in all other systems.

The secondary storage stack 114 (Transportable storage stack) is a hidden or a virtual storage stack which is only accessible via internal virtual network at the hypervisor level 118. The mechanism for accessing the secondary Transportable storage stack is only through the SSP 112 (Secure Stack Protocol). SSP block uses a private protocol and authentication scheme and login passwords that is only known between the primary and the secondary storage stacks. Any communication to the Transportable storage stack must use SSP protocol and authentication to allow access.

All VMs 116 that need access to the system storage use the primary storage stack to communicate with the system storage 122 through standard RAID controller 120.

The secondary transportable storage stack 114 has antivirus software installed. The antivirus will detect any intrusion of all kinds.

The Transportable storage stack 114 in FIG. 1 can be replicated or moved to any other system, if needed, for example for backup or disaster recovery. SSP 112 has also provisions to make Transportable storage stack completely invisible or offline for further security in case of attacks detected by the antivirus software.

Figure 2:
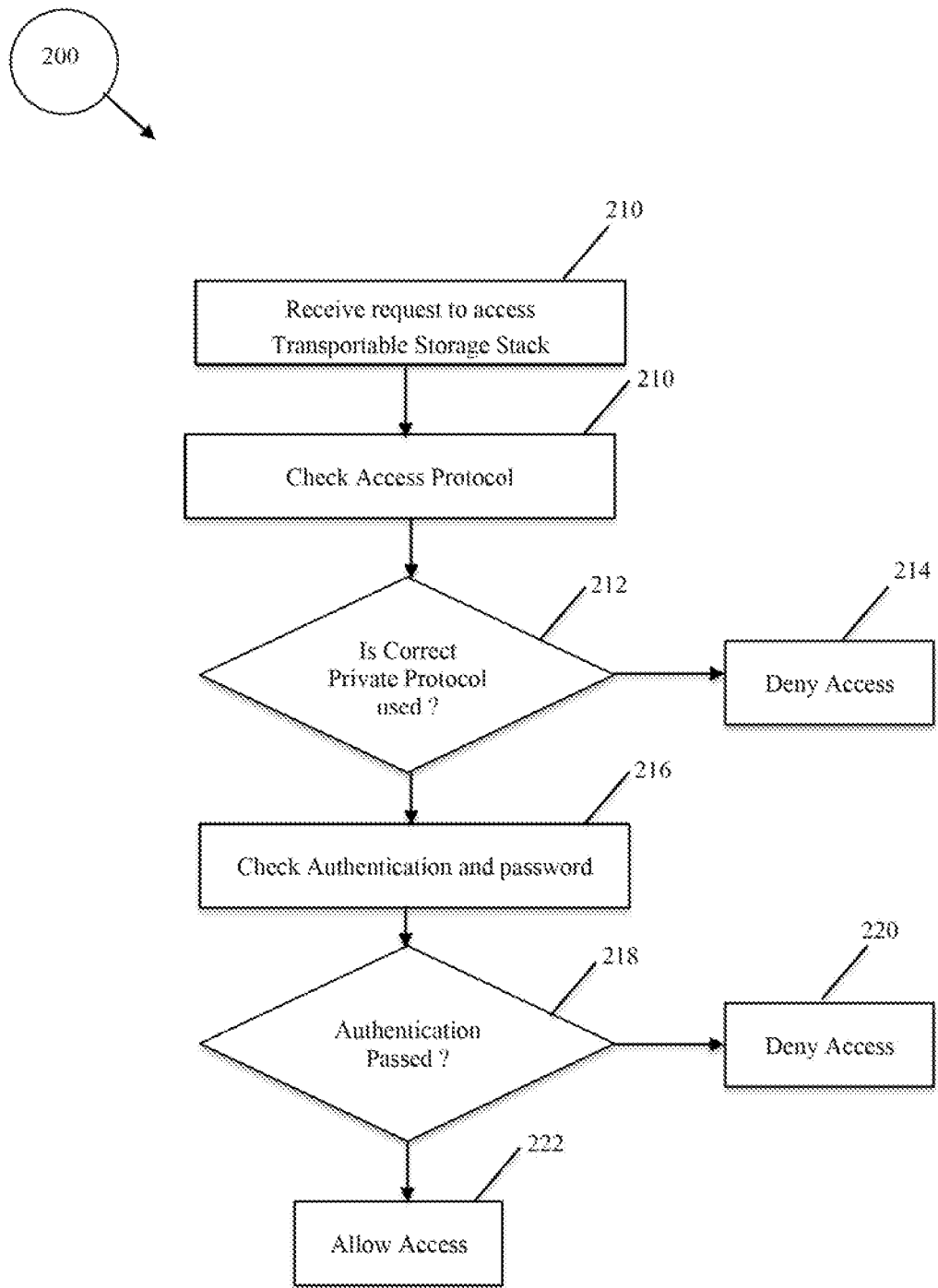
FIG. 2 depicts details of the mechanism for communications between the primary storage stack and the transportable storage stack.

FIG. 2 depicts a flow diagram for SSP apparatus 200. SSP uses protocol check as well as detail authentication to allow communication between the primary storage stack and the Transportable storage stack. When a request for access is received by block 210, the protocol is first checked by block 212. If the protocol used for access is not correct, SSP denies the access request to the transportable storage stack and enters block 214 and no communication is allowed. If the protocol used is correct SSP enters the second level of authentication 216 and checks credentials and login password 218. Again, if SSP does not pass authentication check it denies the access request to the Transportable storage stack and enters block 220 and no communication is allowed. Only when all protocol and authentication checks pass the SSP enters block 222 which allows communication between the primary storage stack and Transportable stack.

The present invention provides data security and isolation at the virtual layer. The separation of primary storage stack from the Transportable storage stack essentially prevents all unauthorized accesses to the data stored in the Transportable storage stack. This is specifically important in backup systems and for disaster recovery where data needs to be highly secure.

In an embodiment, the system uses automation so that the transportable storage stack may be offline or online at specific times (e.g. time sensitive) based on schedule or manual intervention.

In another embodiment, the system automatically turns the transportable storage stack offline in case of detecting network and virus attacks and/or hacks.

In another embodiment, the system may have awareness or decide based on artificial intelligence engine that environment is not safe and therefore turns itself offline or move out on its own.

In another embodiment, the system, may have threat and environment awareness and take a plurality of actions based on the nature of threat and potential risks.

In another embodiment, the system may have scale out transportability features with different protocols and authentications.

In another embodiment, the system may have capability to recreate and orchestrate another system using its own hypervisor and spin off VMs and set up virtual networking and IPs and environment.

In another embodiment, the system may be used for DR or anything that requires high system immunity and high security.

In another embodiment, the system, have transportable VM (Virtual machine) which may be on a second controller in the system with different control mechanism.

In another embodiment, the system, may have multifactor authentication on second storage controller to again access to any resources.

In another embodiment, the system, may further have multifactor multilevel authentication with more than one authenticator on storage controller to again access to any resources.

In another embodiment, the system, may further have a consensus algorithm to achieve agreement among different users in order to authorize access to login, setup, manage, control, modify, delete any resource(s) or function(s) to any one user. Users may establish a minimum number of stakeholders required in order for consensus to be reached and access to be approved. The system consists of user(s), admin(s) and/or stakeholders(s) may also establish a key user(s) or stakeholder(s) that meet certain requirements without whom consensus cannot be reached and validation is not possible.

In another embodiment, the system, may use multi factor authentication within the consensus algorithm to help establish consensus.

While the invention herein disclosed has been described by means of specific protocols, numerous modifications and variations could be made thereto by those skilled in the art without departing from the scope of the invention set forth in the claims.

The invention claimed is:

1. A storage system or server including at least one processor and memory for storing instructions, which instructions are executed by the processor, the storage system or server comprising:
   a primary storage stack, which in communication with the at least one processor, that is accessible through a general use system network; and
   a second transportable air-gapped storage stack that is isolated from external entities,
   wherein the second transportable air-gapped storage stack is accessible by a private protocol known only to the primary storage stack and the second transportable air-gapped storage stack followed by a multiple stakeholder consensus authentication only if the private protocol used is a correct private protocol is used,
   wherein the multiple stakeholder consensus authentication requires agreement among a plurality of predetermined stakeholders selected from a plurality of stakeholders, wherein the plurality of predetermined stakeholders are a subset of the plurality of stakeholders and the plurality of predetermined stakeholders include at least one key stakeholder and the at least one key stakeholder must provide an approval decision input in order for consensus to occur and without the approval decision of the at least one key stakeholder consensus cannot be reached and access is not granted to the second transportable air-gapped storage stack, and
   wherein the plurality of predetermined stakeholders provide decision input to a consensus algorithm and the consensus algorithm uses the provided decision input to achieve consensus and thereby allow access to the second transportable air-gapped storage stack.

2. The storage system or server of claim 1, wherein the transportable air-gapped storage stack can only communicate with the primary storage stack via an internal virtual network.

3. The storage system or server of claim 1, wherein all communication between the primary storage stack and the transportable air-gapped storage stack is done using SSP protocol.

4. The storage system or server of claim 1, wherein the two storage stacks have different authentications for gaining access.

5. The storage system or server of claim 1, wherein a virtual private network with secret key encryption is used for communication between the primary storage stack and the transportable air-gapped storage stack.

6. The storage system or server of claim 1, wherein the system is configured so that the transportable air-gapped storage stack is Write Once Read Many (WORM).

7. An embedded transportable storage stack system, which includes at least one processor and memory for storing instructions, which instructions are executed by the processor, comprising:
- a storage system, which is in communication with the at least one processor, that is isolated from external entities,
- wherein the storage system is cloud-based,
- wherein the storage system is accessible by a primary storage stack via a private protocol known only to the storage system and the primary storage stack followed by a multiple key stakeholder consensus authentication only if the private protocol is used,
- wherein the multiple key stakeholder consensus authentication requires agreement among a plurality of key stakeholders that are selected from a plurality of stakeholders such that the plurality of key stakeholders are a subset of the plurality of stakeholders and the plurality of key stakeholders include at least one key stakeholder that must provide an approval decision input in order for the multiple key stakeholder consensus authentication to occur and without the approval decision input of the at least one key stakeholder consensus cannot be reached and access is not granted to the storage system,
- wherein each of the plurality of key stakeholders provides a decision as an input to a consensus algorithm, and
wherein, when the at least one key stakeholder has provided the approval decision input, then the consensus algorithm uses each provided decision to determine if there is consensus to reach agreement among the plurality of key stakeholders and thereby allow access to the storage system.

8. The system of claim 7, wherein the storage system is configured to be offline or online at specific times in accordance with a schedule.

9. The system of claim 7, wherein the storage system is configured to automatically be offline upon detection of one or more of network attack, virus attack, and hack.

10. The system of claim 7, wherein the storage system detects unsafe environments based on an artificial intelligence engine and turns offline.

11. The system of claim 7, wherein the storage system is configured to detect threat and environment awareness and take a plurality of actions based on the nature of threat and potential risks.

12. The system of claim 7, wherein the storage system is configured to scale out transportability features with different protocols and authentications.

13. The system of claim 7, wherein the storage system is configured to recreate and orchestrate another system using its own hypervisor and spin off virtual machines (VMs) and set up virtual networking and internet protocol (IP) environments.

14. The system of claim 7, wherein the storage system is configured for disaster recovery or anything that requires high system immunity and high security.

15. The system of claim 7 further comprising a transportable virtual machine (VM), which may be on a second controller in the system with different control mechanism.

16. The system of claim 7 further comprising a multifactor authentication on second storage controller to again access to any resources.

17. The system of claim 7 further comprising a multilevel authentication with more than one authenticator on storage controller to again access to any resources.

18. The system of claim 7, wherein the consensus algorithm to achieve agreement among different users in order authorize access to login, setup, manage, control, modify, delete any resource(s) or function(s) to any one user.

19. The system of claim 18, wherein the users establish a minimum number of stakeholders or a key user(s) or specific stakeholder(s) required in order for consensus to be reached and access to be approved.

20. The system of claim 18, wherein multi factor authentication is used within the consensus algorithm to help establish consensus.

* * * * *